United States Patent
Von Arx et al.

(10) Patent No.: US 6,541,744 B2
(45) Date of Patent: Apr. 1, 2003

(54) PACKAGING HAVING SELF-CONTAINED HEATER

(75) Inventors: Theodore Von Arx, La Crescent, MN (US); Keith Laken, Winona, MN (US); John W. Schlesselman, Fountain City, WI (US); Clifford D. Tweedy, St. Charles, MO (US)

(73) Assignee: Watlow Polymer Technologies, Winona, MN (US)

( * ) Notice: Subject to any disclaimer, the term of this patent is extended or adjusted under 35 U.S.C. 154(b) by 0 days.

(21) Appl. No.: 09/781,457

(22) Filed: Feb. 12, 2001

(65) Prior Publication Data

US 2002/0040900 A1 Apr. 11, 2002

Related U.S. Application Data

(63) Continuation-in-part of application No. 09/642,215, filed on Aug. 18, 2000.

(51) Int. Cl.[7] ................................................. H05B 3/16
(52) U.S. Cl. ....................................................... 219/544
(58) Field of Search ................................. 219/544, 545, 219/546, 547, 548, 549, 523, 528, 529, 534, 535

(56) References Cited

U.S. PATENT DOCUMENTS

| 579,611 A | 3/1897 | Smith |
| 1,043,922 A | 11/1912 | Gold ......................... 219/523 |
| 1,046,465 A | 12/1912 | Hoyt |

(List continued on next page.)

FOREIGN PATENT DOCUMENTS

| DE | 35 12 659 A | 9/1986 |
| DE | 3512659 | 10/1986 |
| DE | 38 36 387 C1 | 5/1990 |
| FR | 2 737 380 | 7/1995 |
| GB | 14562 | 9/1913 |
| GB | 1070849 | 6/1967 |
| GB | 1325084 | 8/1973 |
| GB | 1498792 | 1/1978 |
| GB | 2244898 | 12/1999 |
| JP | 53-134245 | 11/1978 |
| JP | 3-129694 | 6/1991 |
| JP | 07 211438 A | 11/1995 |

OTHER PUBLICATIONS

"Polymers", *Guide to Selecting Engineered Materials*, a special issue of *Advanced Materials & Processes*, Metals Park, OH, ASM International, 1989, pp. 92–93.
"Makroblend Polycarbonate Blend, Tedur Polyphenylene Sulfide", *Machine Design: Basics of Design Engineering*, Cleveland, OH, Penton Publishing, Inc., Jun. 1991, pp. 820–821, 863, 866–867.
European Search Report, Jul. 13, 1998.
"At HEI, Engineering is our Middle Name", Heaters Engineering, Inc., Mar. 2, 1995.
"Flexibility and cost Savings with Rope Elements", Heating Engineers, Inc. Aug. 1998.
Desloge Engineering Col, Letter to Lou Steinhauser dated Feb. 19, 1997.

(List continued on next page.)

*Primary Examiner*—Sang Paik
(74) *Attorney, Agent, or Firm*—Duane Morris LLP

(57) ABSTRACT

A heated container is formed from a substantially continuous element structure. The substantially continuous element structure includes an electrically insulative first and second polymeric layers and a resistance heating layer laminated between the first and second polymeric layers. An interior surface of the container includes the first polymeric layer, and the first polymeric layer is thermally conductive. The resistance heating layer has a pair of terminal end portions that may be coupled to a pair of external power leads to energize the resistance heating layer.

36 Claims, 2 Drawing Sheets-

U.S. PATENT DOCUMENTS

| | | | |
|---|---|---|---|
| 1,058,270 A | 4/1913 | Stephens | 219/217 |
| 1,281,157 A | 10/1918 | Hadaway, Jr. | |
| 1,477,602 A | 12/1923 | Simon | |
| 1,674,488 A | 6/1928 | Tang | |
| 1,987,119 A | 1/1935 | Long | 219/39 |
| 1,992,593 A | 2/1935 | Whitney | 219/46 |
| 2,104,848 A | 1/1938 | Clark | 200/137 |
| 2,146,402 A | 2/1939 | Morgan | 219/523 |
| 2,202,095 A | 5/1940 | Delhaye et al. | 219/217 |
| 2,255,527 A | 9/1941 | Locke | 110/29 |
| 2,274,445 A | 2/1942 | Greer | 219/38 |
| 2,426,976 A | 9/1947 | Taulman | 219/19 |
| 2,456,343 A | 12/1948 | Tuttle | 201/67 |
| 2,464,052 A | 3/1949 | Numrich | 219/38 |
| 2,593,087 A | 4/1952 | Baggett | 219/217 |
| 2,593,459 A | 4/1952 | Johnson | 219/39 |
| 2,710,909 A | 6/1955 | Logan et al. | 219/46 |
| 2,719,907 A | 10/1955 | Combs | 219/46 |
| 2,804,533 A * | 8/1957 | Nathanson | 219/522 |
| 2,889,439 A | 6/1959 | Musgrave | 219/19 |
| 2,938,992 A * | 5/1960 | Crump | 219/528 |
| 3,061,501 A | 10/1962 | Dittman et al. | 156/250 |
| 3,173,419 A | 3/1965 | Dubilier et al. | 128/399 |
| 3,191,005 A | 6/1965 | Cox | 219/528 |
| 3,201,738 A | 8/1965 | Mitoff | 338/238 |
| 3,211,203 A | 10/1965 | Creed et al. | 146/81 |
| 3,238,489 A | 3/1966 | Hay | 388/250 |
| 3,268,846 A | 8/1966 | Morey | 338/212 |
| 3,296,415 A | 1/1967 | Eisler | 219/385 |
| 3,352,999 A | 11/1967 | Macoicz et al. | 219/321 |
| 3,374,338 A | 3/1968 | Morey | 219/529 |
| 3,385,959 A | 5/1968 | Ames et al. | |
| 3,496,517 A | 2/1970 | Walter | 339/18 |
| 3,535,494 A * | 10/1970 | Armbruster | 219/528 |
| 3,564,589 A | 2/1971 | Arak | 219/331 |
| 3,573,430 A | 4/1971 | Eisler | 219/385 |
| 3,597,591 A | 8/1971 | Van Derlip | 219/528 |
| 3,614,386 A | 10/1971 | Hepplewhite | 219/312 |
| 3,621,566 A | 11/1971 | Welsh | 29/610 |
| 3,623,471 A | 11/1971 | Bogue et al. | 126/263.01 |
| 3,648,659 A | 3/1972 | Jones | 119/1 |
| 3,657,516 A | 4/1972 | Fujihara | 219/345 |
| 3,657,517 A | 4/1972 | Hoyt | 219/535 |
| D224,406 S | 7/1972 | Heck | D26/1 |
| 3,678,248 A | 7/1972 | Ticault et al. | 219/525 |
| 3,683,361 A | 8/1972 | Salzwedel | 338/322 |
| 3,686,472 A | 8/1972 | Harris | 219/213 |
| 3,707,618 A | 12/1972 | Zeitlin et al. | 219/336 |
| 3,725,645 A | 4/1973 | Shevlin | 219/521 |
| 3,774,299 A * | 11/1973 | Sato et al. | 29/611 |
| 3,781,526 A | 12/1973 | Damron | 219/538 |
| 3,806,701 A | 4/1974 | Scott | 219/438 |
| 3,808,403 A * | 4/1974 | Kanaya et al. | 219/528 |
| 3,831,129 A | 8/1974 | Frey | 339/19 |
| 3,859,504 A * | 1/1975 | Motokawa et al. | 219/528 |
| 3,860,787 A | 1/1975 | Strobach | 219/336 |
| 3,875,373 A | 4/1975 | Lowery et al. | 219/457 |
| 3,878,362 A | 4/1975 | Stinger | 219/528 |
| 3,888,711 A | 6/1975 | Breitner | 156/93 |
| 3,900,654 A * | 8/1975 | Stinger | 428/214 |
| 3,908,749 A | 9/1975 | Williams | 165/2 |
| 3,927,300 A | 12/1975 | Wada et al. | 219/381 |
| 3,933,550 A * | 1/1976 | Erwin | 156/85 |
| 3,943,328 A | 3/1976 | Cunningham | 219/335 |
| 3,952,182 A | 4/1976 | Flanders | 219/309 |
| 3,968,348 A | 7/1976 | Stanfield | 219/535 |
| 3,974,358 A | 8/1976 | Goltsos | 219/387 |
| 3,976,855 A | 8/1976 | Altmann et al. | 219/532 |
| 3,985,928 A | 10/1976 | Watanabe et al. | 428/273 |
| 3,987,275 A | 10/1976 | Hurko | 219/461 |
| 4,021,642 A | 5/1977 | Fields, Jr. | 219/391 |
| 4,038,519 A | 7/1977 | Foucras | 219/301 |
| 4,046,989 A | 9/1977 | Parise et al. | 219/437 |
| 4,058,702 A | 11/1977 | Jerles | 219/321 |
| 4,060,710 A * | 11/1977 | Reuter et al. | 219/548 |
| 4,068,115 A | 1/1978 | Mack et al. | 219/386 |
| 4,083,355 A | 4/1978 | Schwank | 126/39 J |
| 4,094,297 A | 6/1978 | Ballentine | 126/39 J |
| 4,102,256 A | 7/1978 | John et al. | 99/372 |
| 4,112,410 A | 9/1978 | Wrob et al. | 338/243 |
| 4,117,311 A | 9/1978 | Strum | 219/544 |
| 4,119,834 A | 10/1978 | Losch | 392/418 |
| 4,152,578 A | 5/1979 | Jacobs | 219/336 |
| 4,158,078 A | 6/1979 | Egger et al. | 428/102 |
| 4,176,274 A | 11/1979 | Lippera | 219/522 |
| 4,186,294 A | 1/1980 | Bender | 219/527 |
| 4,201,184 A | 5/1980 | Scheidler et al. | 126/39 J |
| 4,217,483 A | 8/1980 | Vogel et al. | 219/514 |
| 4,224,505 A | 9/1980 | Sturm | 219/544 |
| 4,233,495 A | 11/1980 | Scoville et al. | 219/386 |
| 4,245,149 A | 1/1981 | Fairlie | 219/528 |
| 4,250,397 A * | 2/1981 | Gray et al. | 392/435 |
| 4,272,673 A | 6/1981 | Semanaz et al. | 219/544 |
| 4,294,643 A | 10/1981 | Tadewald | 156/293 |
| 4,296,311 A | 10/1981 | Hagglund et al. | 219/464 |
| 4,304,987 A | 12/1981 | van Konynenburg | 219/553 |
| 4,313,053 A | 1/1982 | Sturm | 219/544 |
| 4,313,777 A | 2/1982 | Buckley et al. | 156/272 |
| 4,321,296 A | 3/1982 | Rougier | 428/212 |
| 4,326,121 A | 4/1982 | Welsby et al. | 219/523 |
| 4,334,146 A | 6/1982 | Sturm | 219/492 |
| 4,337,182 A | 6/1982 | Needham | 524/609 |
| 4,346,277 A | 8/1982 | Wojtecki et al. | 219/528 |
| 4,346,287 A | 8/1982 | Desloge | 219/541 |
| 4,349,219 A | 9/1982 | Sturm | 285/21 |
| 4,354,096 A | 10/1982 | Dumas | 219/523 |
| 4,358,552 A | 11/1982 | Shinohara et al. | 523/443 |
| 4,364,308 A | 12/1982 | John et al. | 99/351 |
| 4,375,591 A | 3/1983 | Sturm | 219/544 |
| 4,387,293 A | 6/1983 | Grice et al. | 219/529 |
| 4,388,607 A | 6/1983 | Toy et al. | 338/22 SD |
| 4,390,551 A | 6/1983 | Swartley et al. | 426/107 |
| 4,419,567 A | 12/1983 | Murphy et al. | 219/336 |
| 4,429,215 A | 1/1984 | Sakai et al. | 219/528 |
| 4,436,988 A | 3/1984 | Blumenkranz | 219/544 |
| 4,482,239 A | 11/1984 | Hosono et al. | 355/3 |
| 4,493,985 A | 1/1985 | Keller | 219/535 |
| 4,501,951 A | 2/1985 | Benin et al. | 219/243 |
| 4,530,521 A | 7/1985 | Nyffeler et al. | 285/21 |
| 4,534,886 A * | 8/1985 | Kraus et al. | 252/502 |
| 4,540,479 A | 9/1985 | Sakurai et al. | 204/427 |
| 4,606,787 A | 8/1986 | Pelligrino | 156/632 |
| 4,633,063 A | 12/1986 | Willis | 219/243 |
| 4,640,226 A | 2/1987 | Liff | 119/1 |
| 4,641,012 A | 2/1987 | Roberts | 219/331 |
| 4,658,121 A | 4/1987 | Horsma et al. | 219/553 |
| 4,687,905 A | 8/1987 | Cunningham et al. | 219/336 |
| 4,703,150 A | 10/1987 | Kunnecke et al. | 219/535 |
| 4,707,590 A | 11/1987 | Lefebvre | 219/523 |
| 4,725,717 A | 2/1988 | Harrison | 219/528 |
| 4,730,148 A | 3/1988 | Nakata | 315/397 |
| 4,751,528 A | 6/1988 | Spehrley, Jr. et al. | 346/140 |
| 4,756,781 A | 7/1988 | Etheridge | 156/85 |
| 4,762,980 A | 8/1988 | Insley | 219/307 |
| 4,784,054 A | 11/1988 | Karos et al. | 99/483 |
| 4,797,537 A | 1/1989 | Berthelius et al. | 219/528 |
| 4,845,343 A | 7/1989 | Aune et al. | 219/545 |
| 4,860,434 A | 8/1989 | Louison et al. | 29/611 |
| 4,865,014 A | 9/1989 | Nelson | 126/361 |
| 4,865,674 A | 9/1989 | Durkin | 156/158 |
| 4,866,252 A | 9/1989 | Van Loo et al. | 219/535 |

| | | | |
|---|---|---|---|
| 4,904,845 A | 2/1990 | Wonka | 219/280 |
| 4,911,978 A | * 3/1990 | Tsubone et al. | 428/317.9 |
| 4,913,666 A | 4/1990 | Murphy | 439/709 |
| 4,927,999 A | 5/1990 | Hanselka | 219/535 |
| 4,948,948 A | 8/1990 | Lesage | 219/329 |
| 4,956,138 A | 9/1990 | Barfield | 264/129 |
| 4,970,528 A | 11/1990 | Beaufort et al. | 346/25 |
| 4,972,197 A | 11/1990 | McCauley et al. | 343/704 |
| 4,982,064 A | 1/1991 | Hartman et al. | 219/727 |
| 4,983,814 A | 1/1991 | Ohgushi et al. | 219/545 |
| 4,986,870 A | 1/1991 | Frohlich | 156/382 |
| 4,993,401 A | 2/1991 | Diekmann et al. | 126/39 |
| 5,003,693 A | 4/1991 | Atkinson et al. | 29/849 |
| 5,013,890 A | 5/1991 | Gamble | 392/497 |
| 5,021,805 A | 6/1991 | Imaizumi et al. | 346/76 R |
| 5,023,433 A | 6/1991 | Gordon | 219/548 |
| 5,038,458 A | 8/1991 | Wagoner et al. | 29/593 |
| 5,041,846 A | 8/1991 | Vincent et al. | 346/25 |
| 5,051,275 A | 9/1991 | Wong | 427/58 |
| 5,066,852 A | 11/1991 | Willbanks | 219/544 |
| 5,068,518 A | 11/1991 | Yasuda | 219/549 |
| 5,073,320 A | 12/1991 | Sterzel | 264/101 |
| 5,111,025 A | 5/1992 | Barma et al. | 29/217 |
| 5,113,480 A | 5/1992 | Murphy et al. | 392/501 |
| 5,129,033 A | 7/1992 | Ferrara et al. | 392/447 |
| 5,136,143 A | 8/1992 | Kutner et al. | 219/544 |
| 5,155,800 A | 10/1992 | Rezabek et al. | 382/503 |
| 5,162,634 A | 11/1992 | Kusaka | 219/216 |
| 5,184,969 A | 2/1993 | Sharpless et al. | 445/24 |
| 5,208,080 A | 5/1993 | Gajewski et al. | 428/1 |
| 5,221,419 A | 6/1993 | Beckett | 156/630 |
| 5,221,810 A | 6/1993 | Spahn | 102/475 |
| 5,237,155 A | 8/1993 | Hill | 219/544 |
| 5,252,157 A | 10/1993 | Inhofe, Jr. | 156/158 |
| 5,255,595 A | 10/1993 | Higgins | 99/378 |
| 5,255,942 A | 10/1993 | Kenworthy | 285/21 |
| 5,271,085 A | 12/1993 | Carballo | 392/444 |
| 5,287,123 A | 2/1994 | Medin et al. | 346/140 R |
| 5,293,446 A | 3/1994 | Owens et al. | 392/449 |
| 5,300,760 A | 4/1994 | Batliwalla et al. | 219/549 |
| 5,302,807 A | 4/1994 | Zhao | 219/211 |
| 5,304,778 A | 4/1994 | Dasgupta et al. | 219/270 |
| 5,313,034 A | 5/1994 | Grimm | 156/274.2 |
| 5,389,184 A | 2/1995 | Jacaruso et al. | 156/378 |
| 5,397,873 A | 3/1995 | Stoops et al. | 219/450 |
| 5,406,316 A | 4/1995 | Schwiebert et al. | 347/18 |
| 5,406,321 A | 4/1995 | Schwiebert et al. | 347/102 |
| 5,408,070 A | 4/1995 | Hyllberg | 392/503 |
| 5,453,599 A | 9/1995 | Hall, Jr. | 219/544 |
| 5,461,408 A | 10/1995 | Giles et al. | 347/102 |
| 5,476,562 A | 12/1995 | Inhofe, Jr. | 156/156 |
| 5,477,033 A | 12/1995 | Bergholtz | 219/549 |
| 5,497,883 A | 3/1996 | Monetti | 206/545 |
| 5,500,667 A | 3/1996 | Schwiebert et al. | 347/102 |
| 5,520,102 A | 5/1996 | Monetti | 99/483 |
| 5,521,357 A | 5/1996 | Lock et al. | 219/543 |
| 5,571,435 A | 11/1996 | Needham | 219/544 |
| 5,572,290 A | 11/1996 | Ueno et al. | 399/329 |
| 5,581,289 A | 12/1996 | Firl et al. | 347/103 |
| 5,582,754 A | 12/1996 | Smith et al. | 219/438 |
| 5,586,214 A | 12/1996 | Eckman | 392/503 |
| 5,618,065 A | 4/1997 | Akiyama | 285/21.2 |
| 5,619,240 A | 4/1997 | Pong et al. | 347/103 |
| 5,625,398 A | 4/1997 | Milkovits et al. | 347/104 |
| 5,633,668 A | 5/1997 | Schwiebert et al. | 347/102 |
| 5,691,756 A | 11/1997 | Rise et al. | 347/102 |
| 5,697,143 A | 12/1997 | Barfield | 29/611 |
| 5,703,998 A | 12/1997 | Eckman | 392/340 |
| 5,708,251 A | 1/1998 | Naveh | 219/121.66 |
| 5,714,738 A | 2/1998 | Hauschulz et al. | 219/535 |
| 5,779,870 A | 7/1998 | Seip | 205/77 |
| 5,780,817 A | 7/1998 | Eckman et al. | 219/458 |
| 5,780,820 A | 7/1998 | Komyoji et al. | 219/543 |
| 5,781,412 A | 7/1998 | De Sorgo | 361/704 |
| 5,806,177 A | 9/1998 | Hosomi et al. | 29/846 |
| 5,811,769 A | 9/1998 | Schiffmann et al. | 219/762 |
| 5,818,016 A | * 10/1998 | Lorence et al. | 219/730 |
| 5,822,675 A | 10/1998 | Paquet et al. | 428/561 |
| 5,824,996 A | 10/1998 | Kochman et al. | 219/529 |
| 5,829,171 A | 11/1998 | Weber et al. | 36/93 |
| 5,835,679 A | 11/1998 | Eckman et al. | 392/503 |
| 5,856,650 A | 1/1999 | Rise et al. | 219/216 |
| 5,883,364 A | 3/1999 | Frei et al. | 219/535 |
| 5,902,518 A | 5/1999 | Khazai et al. | 252/511 |
| 5,930,459 A | * 7/1999 | Eckman et al. | 392/503 |
| 5,940,895 A | 8/1999 | Wilson et al. | 4/237 |
| 5,947,012 A | 9/1999 | Ewald et al. | 99/374 |
| 5,954,977 A | 9/1999 | Miller et al. | 219/201 |
| 5,961,869 A | 10/1999 | Irgens | 219/549 |
| 6,037,574 A | 3/2000 | Lanham et al. | 219/544 |
| 6,056,157 A | 5/2000 | Gehl et al. | 222/94 |
| 6,089,406 A | 7/2000 | Feldner | 222/103 |
| 6,137,098 A | 10/2000 | Moseley et al. | 219/727 |
| 6,147,332 A | 11/2000 | Holmberg et al. | 219/526 |
| 6,147,335 A | 11/2000 | Von Arx et al. | 219/544 |
| 6,150,635 A | 11/2000 | Hannon et al. | 219/386 |
| 6,162,385 A | 12/2000 | Gross-Puppendahl et al. | 264/250 |

OTHER PUBLICATIONS

Encon Drawing No. 500765 (Jun. 10, 1987).

Vulcan Electric Company Trade Literature entitled "Bushing Immersion Heaters", 1983.

Trade Literature "Euro–Burner Solid Disc Conversion Burners" Energy Convertors, Inc., Dallas, PA 1991.

"Polymers," *Guide to Selecting Engineering Materials*, a special issue of Advanced Materials& Presses, Metals Park, OH, ASM International, 1990, pp. 32–33.

Machine Design, "Basics of Design Engineering" Jun. 1991, pp. 429–432, 551, 882–884.

Machine Design, "Basics of Design Engineering", Jun. 1994, pp 624–631.

Machine Design, May 18, 2000, 3 pages.

Carvill, Wm. T., "Prepreg Resins", Enginerred Materials Handbook, vol. 1, Composites pp. 139–142.

A.M. Wittenberg, "Pin Shorting Contact," Western Electric Technical Digest No. 60, Oct. 1980, p. 25.

International Search Report, Aug. 8, 2000.

Kronenberg, K.J., "Magnetic Water Treatment De–Mystified", Green Country Environmental Associates, LLC, pp 1–8.

* cited by examiner

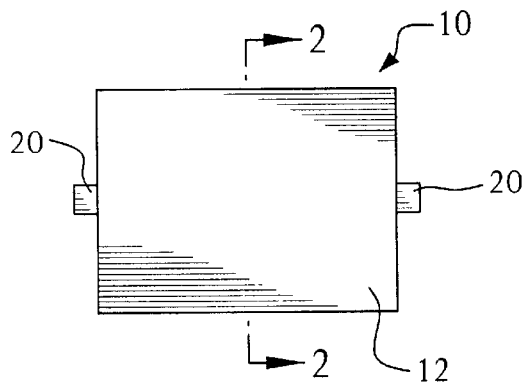
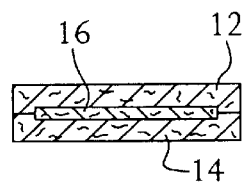
FIG. 2
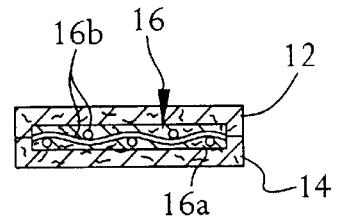
FIG. 2A
FIG. 1
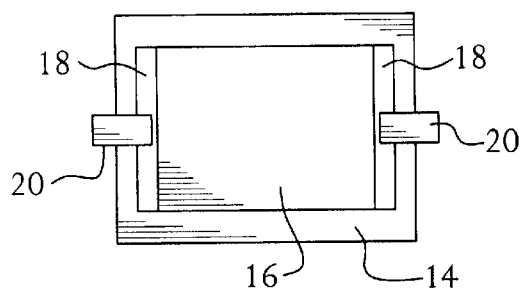
FIG. 3
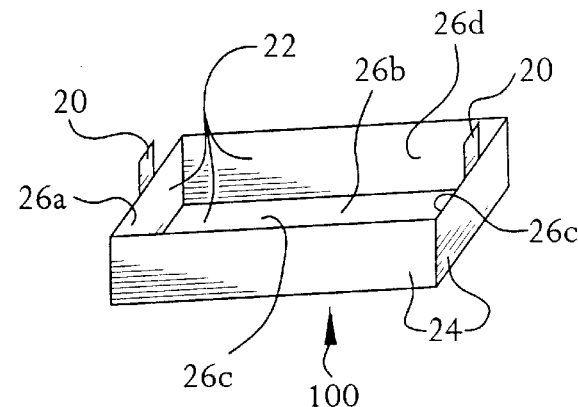
FIG. 4
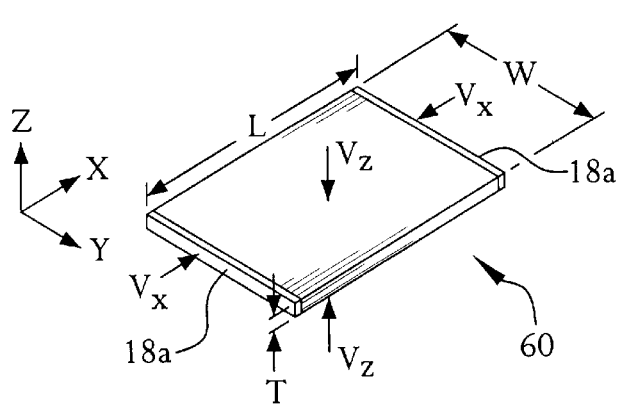
FIG. 5
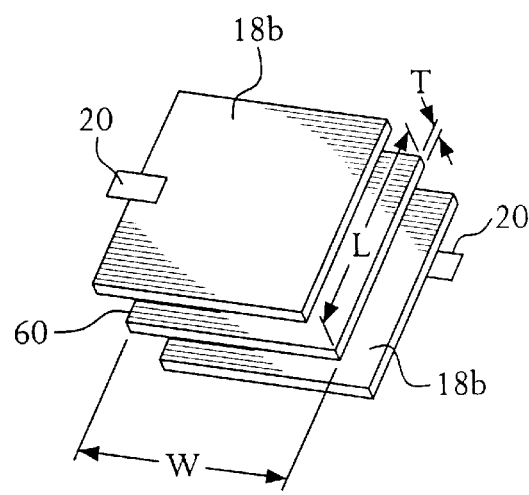
FIG. 5A

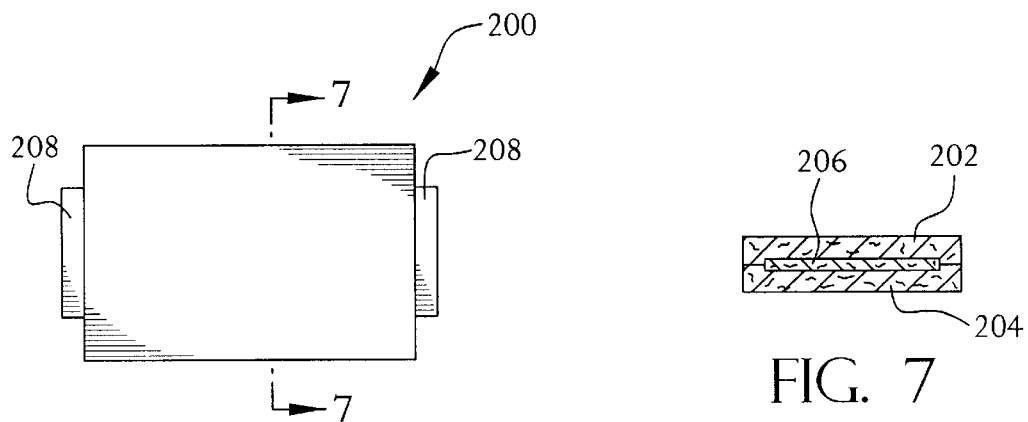
FIG. 6
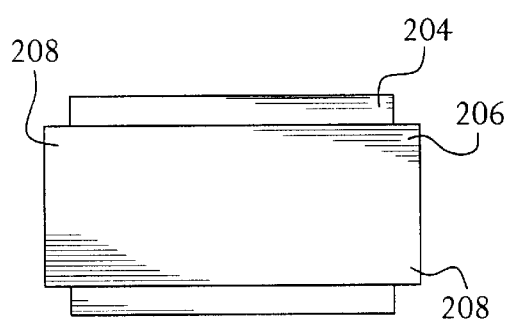
FIG. 8
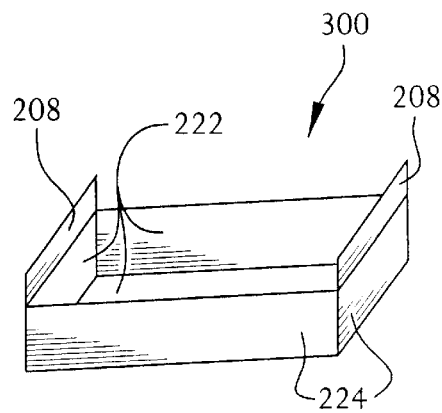
FIG. 7 / FIG. 9
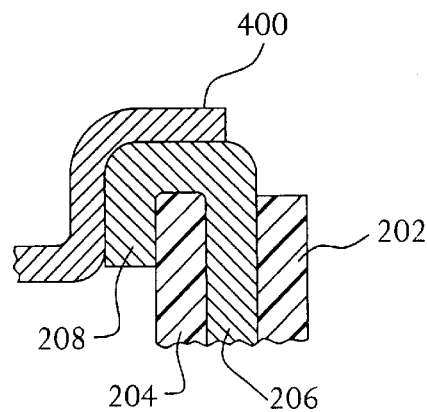
FIG. 10

PACKAGING HAVING SELF-CONTAINED HEATER

CROSS-REFERENCE TO RELATED APPLICATIONS

This application is a continuation in part of U.S. patent application Ser. No. 09/642,215 to Theodore Von Arx, Keith Laken and John W. Schlesselman, entitled "Formable thermoplastic laminate heated element assembly," filed on Aug. 18, 2000, the entirety of which is hereby incorporated by reference herein.

This Application is also related to U.S. application Ser. No. 09/369,779 of Theodore Von Arx, filed Aug. 6, 1999, entitled "Electrofusing of thermoplastic heating elements and elements made thereby"; U.S. application Ser. No. 09/416,731 of John Schlesselman and Ronald Papenfuss, filed Oct. 13, 1999, entitled "Heating element containing sewn resistance material"; U.S. application Ser. No. 09/275, 161 of Theodore Von Arx, James Rutherford and Charles Eckman, filed Mar. 24, 1999, entitled "Heating element suitable for preconditioning print media" which is a continuation in part of U.S. application Ser. No. 08/767,156 filed on Dec. 16, 1996, now U.S. Pat. No. 5,930,459, issued on Jul. 27, 1999, which in turn is a continuation in part of U.S. application Ser. No. 365,920, filed Dec. 29, 1994, now U.S. Pat. No. 5,586,214, issued on Dec. 17, 1996; U.S. application Ser. No. 09/544,873 of Theodore Von Arx, Keith Laken, John Schlesselman, and Ronald Papenfuss, filed Apr. 7, 2000, entitled "Molded assembly with heating element captured therein"; U.S. application Ser. No. 09/611,105 of Clifford D. Tweedy, Sarah J. Holthaus, Steven 0. Gullerud, and Theodore Von Arx, filed Jul. 6, 2000, entitled "Polymeric heating elements containing laminated, reinforced structures and processes for manufacturing same"; and U.S. application Ser. No. 09/309,429 of James M. Rutherford, filed May 11, 1999, entitled "Fibrous supported polymer encapsulated electrical component" which are all hereby incorporated by reference herein.

FIELD OF THE INVENTION

This invention relates to electrical resistance heating elements, and more particularly to formable thermoplastic laminate heated element assemblies.

BACKGROUND OF THE INVENTION

It is known that polymers can be made electrically conductive by dispersing therein suitable amounts of finely divided conductive fillers, such as those comprising carbon black. Examples of such polymers may be found in U.S. Pat. No. 5,902,518 to Khazai et al., issued May 11, 1999 and in U.S. Pat. No. 4,388,607 to Toy et al., issued Jun. 14, 1983, the entirety of which are hereby incorporated by reference herein. Also, sheets of fibrous materials including conductive fibrous particles, such as carbon fibers, and having a pair of electrodes disposed on the surface of the sheets have been proposed as electrical heating units, such as is disclosed in U.S. Pat. No. 5,023,433 to Gordon, the entirety of which is incorporated by reference herein.

Still further, a heated container and a heated packaging for a product and method of manufacturing the same are described in Applicant's co-pending application Ser. No. 09/642,215, herein incorporated in its entirety by reference. Several prior approaches to laminated heaters are also described in the application.

There still remains a need, however, for a heated container formed from a reformable but robust laminate electrical resistance heating element that effectively places the contents of the container in intimate contact with the heat source as well as a heated container that preferentially biases generated heat towards the product. There also remains a need for a heated container that provides for a more uniform heat distribution along the interior surface of the container. Still further, there remains a need for an economically manufactured and disposable container that is microwaveable while still providing the option of energizing the container to heat the contents therein.

SUMMARY OF THE INVENTION

The present invention provides a container comprising an electrically insulative and thermally conductive first polymeric layer, an electrically insulative and thermally insulative second polymeric layer, and a resistance heating layer laminated between the first and second polymeric layers to form a substantially continuous element structure. The resistance heating layer is coupled to a pair of electrical connectors. The substantially continuous element structure is formed into a final container structure having an interior and an exterior surface. The interior surface comprises the first polymeric layer and the exterior surface comprises the second polymeric layer.

The present invention as described above provides several benefits. A resistance heating layer is formed integral with the container, which places the contents of the container in intimate contact with the heat source, thereby providing for maximum use of the generated heat. The container can take on an infinite number of shapes and sizes, either open or closed, and even serve as the original packaging of a product, such as a food product. In that case, the product's packaging may then be coupled to a power source, thereby heating the product while still in its original packaging. The continuous element structure may be thermoformed into a desired three dimensional heated plane, and known stamping or die cutting techniques may be used to cut the continuous element structure into reformable profiles. The heated element assembly thereby emulates well known sheet metal processing or known plastic forming processes and techniques. The continuous element structure is also robust enough to be included in injection, blow, vacuum, or compression molding processes to form a heated container or be over molded in a second molding step.

The above and other features of the present invention will be better understood from the following detailed description of the preferred embodiments of the invention which is provided in connection with the accompanying drawings.

A BRIEF DESCRIPTION OF THE DRAWINGS

The accompanying drawings illustrate preferred embodiments of the invention, as well as other information pertinent to the disclosure, in which:

FIG. 1 is a top plan view of an exemplary continuous element structure according to the present invention which may be formed into a container structure;

FIG. 2 is a cross-sectional view of the continuous element structure of FIG. 1 taken along lines 2—2;

FIG. 2A is a cross-sectional view of the continuous element structure of FIG. 1 illustrating a resistance heating layer including a conductive polymeric resistance heating layer and a conductive cloth;

FIG. 3 is a top plan view of the continuous element structure of FIG. 1 shown with the top layer removed;

FIG. 4 is a perspective view of an exemplary container according to the present invention;

FIG. 5 is a perspective view of a conductive polymeric resistance heating layer formed from the continuous element structure of FIG. 1;

FIG. 5A is an exploded view of a resistance heating layer coupled between two conductive planes;

FIG. 6 is a top plan view of another exemplary continuous element structure according to the present invention which may be formed into a container structure;

FIG. 7 is a cross-sectional view of the continuous element structure of FIG. 6 taken along lines 7—7;

FIG. 8 is a top plan view of the continuous element structure of FIG. 6 shown with the top layer removed;

FIG. 9 is a perspective view of an exemplary container according the present invention formed from the continuous element structure of FIG. 6; and FIG. 10 is a partial side elevational, cross-sectional view illustrating a container coupled to an external electrical connector.

DETAILED DESCRIPTION OF THE INVENTION

The present invention provides containers comprising laminated continuous heating element structures. As used herein, the following terms are defined:

"Laminate" means to unite laminae via bonding them together, usually with heat, pressure and/or adhesive. It normally is used to refer to flat sheets, but also can include rods and tubes. The term refers to a product made by such bonding.

"Serpentine Path" means a path which has one or more curves for increasing the amount of electrical resistance material in a given volume of polymeric matrix, for example, for controlling the thermal expansion of the element.

"Container" means an open or sealed, non-planar structure shaped to hold contents, either liquid, solid or gas, that are to be heated. Examples of containers include, but are not limited to, cups or cones, bags, boxes, trays, and the like.

"Conductive Cloth" means a woven or non-woven fibrous structure, with or without a supporting substrate, including conductive fibers or fibers coated with a conductive material.

"Conductive polymeric resistance heating layer" means a polymeric film including additives, such as conductive fibers or fibers coated with a conductive material, that permit electricity to conduct across or through the film and generates heat when energized.

"Volume Resistivity" means the electrical resistance of a specific volume of material, based on the resistance between opposite faces of a one centimeter cube of the given material; expressed in ohm-centimeters.

Container Construction

With specific reference to FIGS. 1–4, a continuous element structure 10 is shown that may be formed into a heated container, such as container 100. An exemplary embodiment of a continuous element structure 10, and thus of container 100, includes a first polymeric layer 12 and a second polymeric layer 14. A resistance heating layer 16 is laminated between the first and second polymeric layers 12, 14 to form a substantially continuous element structure 10 and preferably with little air trapped between the layers.

The resistance heating layer 14 generates heat when energized by a power source coupled to a pair of electrical connectors which may include conductive strips 18 and conductive leads 20. Conductive strips 18 may be sewn, glued, stapled or otherwise attached to resistance heating layer 16. Leads 20 may be attached in a similar manner. An alternative means for coupling a resistance heating layer to a power source is described below in connection with FIGS. 9 and 10.

In an exemplary embodiment of the continuous element structure, the resistance heating layer 16 may include a conductive polymeric resistance heating layer or a conductive cloth. The conductive polymeric resistance heating layers and conductive cloth constructions and methods of manufacturing the same are known, the details of which are not repeated herein. The conductive cloth may be a woven or non-woven conductive cloth with or without a supporting substrate and include conductive fibers, such as graphite fibers, carbon fibers, or fibers coated with graphite or carbon. One example of a conductive cloth is a non-woven cloth including carbon fibers available from Conoco Carbon Fibers of Houston, Tex. and Technical Fiber Products of State Hill, N.Y. A conductive cloth may be formed into a serpentine circuit path, but the cloth provides excellent uniform heat distribution on a heat plane(s) when provided in planar form as shown in FIG. 3.

An exemplary conductive polymeric resistance heating material includes an extruded polycarbonate film including carbon black particles or carbon nanotubes. The polymeric resistance heating material may likewise be provided in a serpentine circuit path, but a substantially uniform heat plane is created when the conductive polymeric resistance heating material is provided in a planar form as shown in FIG. 3. Further, the heat distribution of a resistance heating layer such as a conductive polymeric resistance heating layer or conductive cloth can be selected and controlled through material selection, coupling orientation, and size parameters in order to produce consistent results in response to known voltages.

It should be understood that a resistance heating layer such as a polymeric resistance heating layer or a conductive cloth may be coupled to a voltage source such that current flows in the "x", the "y" or the "z" direction (illustrated by the direction arrows of FIG. 5). For example, a conductive polymeric resistance heating layer 60 may be coupled to a voltage bias $V_x$ as shown in FIG. 5 through conductive strips 18a coupled to the resistance heating layer 60 along the lateral edges defined by W and T (or as defined by L and T if desired). Knowing the following electrical characteristics of conductive polymeric resistance heating layers generally:

$$Power = \frac{V^2}{R}, \tag{1}$$

where V is the applied voltage in volts, Power is measured in watts, and R is resistance measured in ohms;

$$(wsi) = \frac{Power}{W * L}, \tag{2}$$

where (wsi) is power dissipated in watts per square inch, W is the width of the conductive polymeric resistance heating layer in inches, and L is the Length of the conductive polymeric resistance heating layer in inches; and $$\text{Volume Resistivity} = \frac{R * A}{L}, \tag{3}$$

where A=T*W and T is the thickness of the polymeric resistance heating element in inches; then $$\text{Volume Resistivity} = \frac{V^2 * T}{.3937 * L^2 * (wsi)}, \tag{4}$$

where Volume Resistivity is in ohm-centimeters, V is in volts, and (wsi) is the watt per square inch output on the top and bottom surfaces defined by L and W of the conductive polymeric resistance heating layer.

The above Volume Resistivity formula (4) may be used to calculate, for example, required resistivities for materials in order to provide a selected watts per square inch output, at selected dimensions and for selected voltages coupled to the resistance heating layer in the "x" direction. The following table illustrates this design capability.

In an alternative construction, the container may include a resistance heating layer 16 comprising a conductive polymeric resistance heating layer and a conductive cloth. The conductive polymeric layer and conductive cloth may be laminated between the first and second polymeric layers 12, 14. An example of such structure is shown in the cross-

| Voltage (volts) (wsi) | T (inches) | L (inches) | W (inches) | 1.5 Volume Resistivity (ohm-cm) | 9 Volume Resistivity (ohm-cm) | 24 Volume Resistivity (ohm-cm) | 120 Volume Resistivity (ohm-cm) | 240 Volume Resistivity (ohm-cm) |
|---|---|---|---|---|---|---|---|---|
| 1  | 0.01 | 12 | 1 | 3.969E−04 | 1.429E−02 | 1.016E−01 | 2.540E+00 | 1.016E+01 |
| 10 | 0.01 | 12 | 1 | 3.969E−05 | 1.429E−03 | 1.016E−02 | 2.540E−01 | 1.016E+00 |
| 20 | 0.01 | 12 | 1 | 1.984E−05 | 7.144E−04 | 5.080E−03 | 1.270E−01 | 5.080E−01 |
| 30 | 0.01 | 12 | 1 | 1.323E−05 | 4.763E−04 | 3.387E−03 | 8.467E−02 | 3.387E−01 |
| 40 | 0.01 | 12 | 1 | 9.922E−06 | 3.572E−04 | 2.540E−03 | 6.350E−02 | 2.540E−01 |
| 50 | 0.01 | 12 | 1 | 7.938E−06 | 2.858E−04 | 2.032E−03 | 5.080E−02 | 2.032E−01 |
| 1  | .1 | 12 | 1 | 3.969E−03 | 1.429E−01 | 1.016E+00 | 2.540E+01 | 1.016E+02 |
| 10 | .1 | 12 | 1 | 3.969E−04 | 1.429E−02 | 1.016E−01 | 2.540E+00 | 1.016E+01 |
| 20 | .1 | 12 | 1 | 1.984E−04 | 7.144E−03 | 5.080E−02 | 1.270E+00 | 5.080E+00 |
| 30 | .1 | 12 | 1 | 1.323E−04 | 4.763E−03 | 3.387E−02 | 8.467E−01 | 3.387E+00 |
| 40 | .1 | 12 | 1 | 9.922E−05 | 3.572E−03 | 2.540E−02 | 6.350E−01 | 2.540E+00 |
| 50 | .1 | 12 | 1 | 7.938E−05 | 2.858E−03 | 2.032E−02 | 5.080E−01 | 2.032E+00 |

The resistance heating layer may also be coupled to a voltage source $V_z$ through conductive planes 18b contacting resistance heating layer 60 along the top and bottom surface defined by L and W as shown in FIG. 5A. The conductive plane may be any suitable conductor, such as an aluminum layer or conductive powder layer. Using the same methodology as described above, volume resistivity may be calculated according to the following formula (5):

$$\text{Volume Resistivity} = \frac{V^2}{.3937 * T * (wsi)}, \qquad (5)$$

where Volume Resistivity is in ohm-centimeters, V is in volts, (wsi) is the watt per square inch output on the top and bottom surfaces defined by L and W of the conductive polymeric resistance heating layer, and T is thickness in inches of the conductive polymeric resistance heating layer.

The above Volume Resistivity formula (5) may be used to calculate, for example, required resistivities for materials to provide a selected watts per square inch output, at selected dimensions and for selected voltages coupled to the resistance heating layer so that current flows in the "z" direction. The following table illustrates this design capability.

sectional view of FIG. 2A, which illustrates a resistance heating layer 16 including a conductive cloth 16b (illustrated as a woven cloth) laminated with a conductive polymeric layer 16a to form a substantially continuous resistance heating layer.

Preferred polymeric materials for the first and second polymeric layers 12, 14 comprise several thermoplastic materials, including, for example: polyethylene (high and low density), polystyrene, acrylic, acetal, ABS, cellulosics, nylons, polyurethane, fluorocarbons, polypropylene, polycarbonate, polyetherimide, polyether sulphone, polyaryl-sulphones, polyimides, and polyetheretherkeytones, polyphenylene sulfides, polyether sulphones, and mixtures and co-polymers of these thermoplastics. It is further understood that, although thermoplastic plastics are most desirable for fusible layers because they are generally heat-flowable, some thermoplastics, notably polytetraflouroethylene (PTFE) and ultra high-molecular-weight polyethylene (UHMWPE) do not flow under heat alone. Also, many thermoplastics are capable of flowing without heat, under mechanical pressure only. Additionally, some thermosetting polymers can also be used, such as epoxy, polyesters, silicones, phenolics, aminos and alkyds.

Exemplary lamination techniques for forming a continuous element structure having a sewn resistance heating

| Voltage (volts) (wsi) | T (inches) | L (inches) | W (inches) | 1.5 Volume Resistivity (ohm-cm) | 9 Volume Resistivity (ohm-cm) | 24 Volume Resistivity (ohm-cm) | 120 Volume Resistivity (ohm-cm) | 240 Volume Resistivity (ohm-cm) |
|---|---|---|---|---|---|---|---|---|
| 1  | 0.01 | 1 | 1 | 5.715E+02 | 2.057E+04 | 1.463E+05 | 3.658E+06 | 1.463E+07 |
| 10 | 0.01 | 1 | 1 | 5.715E+01 | 2.057E+03 | 1.463E+04 | 3.658E+05 | 1.463E+06 |
| 20 | 0.01 | 1 | 1 | 2.858E+01 | 1.029E+03 | 7.315E+03 | 1.829E+05 | 7.315E+05 |
| 30 | 0.01 | 1 | 1 | 1905E+01 | 6.858E+02 | 4.877E+03 | 1.219E+05 | 4.877E+05 |
| 40 | 0.01 | 1 | 1 | 1.429E+01 | 5.144E+02 | 3.658E+03 | 9.144E+04 | 3.658E+05 |
| 50 | 0.01 | 1 | 1 | 1.143E+01 | 4.115E+02 | 2.926E+03 | 7.315E+04 | 2.926E+05 |
| 1  | .1 | 1 | 1 | 5.715E+01 | 2.057E+03 | 1.463E+04 | 3.658E+05 | 1.463E+06 |
| 10 | .1 | 1 | 1 | 5.715E+00 | 2.057E+02 | 1.463E+03 | 3.658E+04 | 1.463E+05 |
| 20 | .1 | 1 | 1 | 2.858E+00 | 1.029E+02 | 7.315E+02 | 1.829E+04 | 7.315E+04 |
| 30 | .1 | 1 | 1 | 1.905E+00 | 6.858E+01 | 4.877E+02 | 1.219E+04 | 4.877E+04 |
| 40 | .1 | 1 | 1 | 1.429E+00 | 5.144E+01 | 3.658E+02 | 9.144E+03 | 3.658E+04 |
| 50 | .1 | 1 | 1 | 1.143E+00 | 4.115E+01 | 2.926E+02 | 7.315E+03 | 2.926E+04 | element laminated between a first and second thermoplastic layers are described in U.S. patent application Ser. No. 09/642,215 to Theodore Von Arx, Keith Laken and John W. Schlesselman, entitled "Formable thermoplastic laminate heated element assembly," filed on Aug. 18, 2000, incorporated by reference above. These lamination techniques may be utilized to produce the continuous element structure 10 described above.

The selected polymers for the first and second polymeric layers 12, 14 are preferably matched to promote the formation of a homogenous substantially continuous element structure 10 during lamination. If the resistance heating layer 16 includes a polymer-based resistance heating layer, the polymer is preferably also matched to the first and second polymeric layers 12, 14.

The first polymeric layer 12 is preferably electrically insulative and thermally conductive. The layer 12 may include thermally conductive, but preferably not electrically conductive, additives. Examples of such additive may be ceramic powders, such as, for example, $Al_2O_3$, MgO, $ZrO_2$, boron nitride, silicon nitride, $Y_2O_3$, SiC, $SiO_2$, $TiO_2$, etc. The second polymeric layer 14, while also electrically insulative, is also preferably thermally non-conductive or insulative. Most polymers such as thermoplastics are thermally insulative, and recognizing that this attribute is reduced as the thickness of the plastic layer decreases, the second polymeric layer 14 is preferably thicker than the first polymeric layer 12. The second polymeric layer 14 may also or alternatively include a thermally insulative additive such as talc. The interior surface 22 of container 100 is defined by first polymeric layer 12, and the exterior surface of container 100 is defined by second polymeric layer 14. In this manner and through material and size selection, heat generated by the resistance heating layer 16 may be biased through polymeric layer 12, and away from polymeric layer 14, towards any contents disposed within the container 100.

Preferred thicknesses for the first and second polymeric layers as well as for the conductive polymeric resistance heating layer may range approximately from 0.004 to 0.1 inch, and more preferably between 0.004 and 0.030 inch. Preferred thicknesses for the conductive cloth range approximately from 0.001 to 0.050 inch.

A laminated planar structure such as continuous element structure 10 may be formed into more complex, non-planar structure, such as a container 100, from a die-cut or stamped profile using known techniques, such as those developed in the sheet metal processing industry. For example, the structure 10 may be stamped or die cut into a foldable box profile (not shown) that may be reformed into a non-planar container 100 shown in FIG. 4. The folding step may include rethermalizing the continuous element structure while folding in order to thermoform the structure into the desired heat planes. Alternatively, a simple rectangular shape as shown in FIG. 1 may be thermoformed into a box shape and the corners may be crimped or bunched together, as is done with, for example, a disposable aluminum or tin lasagna tray. If this approach is utilized, the resistance heating layer 16 may be oriented so that it does not occupy the bunched or crimped area.

The exemplary continuous element structure 10, then, is a semi-rigid structure in that it may be reformed, such as by simply folding or folding under heat, pressure, or a combination thereof as required by the chosen polymer or thermoplastic, into a desired shape without sacrificing the integrity of the structure.

Heated containers according to the present invention provide several advantages over non-rigid and rigid containers which do not include a heat source according to the present invention. The heat source, i.e., the resistance heating layer 16, is in intimate contact with the contents of the container, which may be, for example, blood plasma, food product, or other contents, whether they be gaseous, liquid, solid, or semi-solid. The product's packaging effectively doubles as its heat source, thereby removing layers of material or air space between the contents and its heat source as well as eliminating the need for an external heat source, i.e., the container need only be coupled to a power source. Also, secondary devices, such as a thermistor or thermocouple, may be disposed more intimately with the contents or conditions that are being monitored or controlled.

Heat can also be generated on a plurality of planes, e.g., walls 26a, 26b, 26c of the interior surface 22 of container 100, even though the container is formed from a planar continuous element structure 10. A second resistance heating layer 16 may also be included in an additional laminate layer in the continuous element structure 10, i.e., a first resistance heating layer captured between a first and second polymeric layers and a second resistance heating layer captured between one of the first and second polymeric layers and a third polymeric layer. The second resistance heating layer may be oriented to provide heat to walls 26d, 26b, and 26e.

A continuous element structure 10 also has sufficient mechanical rigidity such that it may be utilized, in whole or in part, in injection molding and compression molding encapsulation processes in order to form a selected molded and more durable heated container. The element structure 10 may optionally be thermoformed to conform to at least a part of the mold structure and to preferentially align the resistance heating element within a mold. Once the element structure is positioned within a mold, the resistance heating layer 16 may be energized to soften the polymeric layers, and the element structure may be over molded with a polymer such as a thermoplastic. The energizing and overmolding may be timed such that the first and second polymeric layers and over molded polymeric layer form a substantially homogenous structure when solidified. Alternatively, the first and second polymeric layers may be allowed to soften as a result of mold flow alone. The polymeric materials of the layers and over molded polymeric layer are preferably matched to further facilitate the creation of a homogenous structure. The energizing may be timed to soften the polymeric layer before, after, or during the overmolding process, depending upon the standard molding parameters, such as the flow characteristic of the selected polymer, the injection molding fill time, the fill velocity, and mold cycle. The element structure 10 is also amenable to injection-compression molding, thermoforming and vacuum forming. It should be apparent then that the continuous element structure may be formed into a heated container using a plurality of known techniques familiar to those in the plastic industry.

Thin heated containers according to the present invention also provide design flexibility because the designer is able to use wattages that more fully take advantage of a polymer's full RTI rating. The product to be heated is placed in intimate contact with the resistance heating source such that there is excellent thermal transfer to the product. Few air gaps are present, leading to fewer opportunities for hot spots and fewer opportunities to exceed a polymers RTI rating at lower wattages. Larger wattages can be used without increasing the risk to exceeding the polymer layer's RTI ratings because of poor heat transfer.

The container 100 described above is particularly adapted to be the original packaging for frozen foods produced and packaged in an assembly line fashion. The food product, e.g., a non-frozen lasagna dinner, may be prepared in the container 100. Each container 100 containing the lasagna product is then frozen for shipment and storage. The container doubles as the lasagna product's packaging and heater. Because the product is frozen in its container (rather than being frozen when placed within the container 100), the product tends to conform to the interior surface 26 of the container 100, thus insuring excellent contact between the heat source and the product to be heated and substantially reducing unwanted air gaps separating the product and its heat source. These air gaps are poor thermal conductors and do not conduct heat well away from the surface 26 of a container, such as container 100. The polymeric layers of a container such as container 100 can be damages if high wattages are used when an abundance of air gaps are present. A possible solution is to lower the wattage and allowing for a longer cooking time. By minimizing these air gaps through freezing the product in a package that doubles as its heat source, however, good thermal transfer between the heat source and the food product allows higher watt densities to be utilized. This in turn leads to shorter cooking periods and overall greater cooking efficiency.

The resistance heating layer 16 of a container 100 may also include a PTC polymeric resistance heating material, such as those described in U.S. Pat. No. 5,902,518 discussed in the "Background of the Invention" section. The PTC polymeric resistance heating material effectively stops producing resistance heat when a threshold temperature is met. If the threshold temperature corresponds to or is less than the RTI rating of the first and/or second polymeric layers 12,14, the resistance heating layer 16 can be made to turn "off", i.e., stop producing resistance heat, before the RTI rating of the polymeric layer is exceeded. If the resistance heating layer 16 including a PTC polymeric resistance heating material is coupled to a power source such that current flows in the "z" direction as described above, then portions of the resistance heating layer 16 can turn "off" while other portions of the resistance heating layer 16 continue to produce heat. This feature allows a relatively high watt density design to be used even when, for example, there is a chance that only a portion of the container 100 will be filled with a product to be heated (e.g., leftovers). If only a portion of a higher watt density designed container was filled with product, there is an increase in the surface area of the container that does not contact a food product that conducts heat away from the surface of the polymeric layer 12. Since air is a relatively poor thermal conductor, it is desirable to be able to switch "off" areas of the resistance heating layer 16 that correspond to these "empty" portions of the container in order to avoid generating hot spots and, therefore, to avoid reaching a temperature that exceeds the RTI rating of the polymeric layer 12.

With specific reference to FIGS. 6–11, another exemplary embodiment of a container 300 and continuous element structure 200 are shown. The continuous element structure 200 includes a first electrically insulative polymeric layer 202 and a second electrically insulative polymeric layer 204. A resistance heating layer 206 is laminated between the first and second polymeric layers 202, 204 to form a substantially continuous element structure 200. The continuous element structure 200 may be formed into a container in a manner described above.

The resistance heating layer 206 has a pair of terminal end portions, such as exposed end portions 208, that may be coupled to a pair of external power leads to energize the resistance heating layer 206 (and thus the container 300).

Examples of suitable resistance heating layers include a conductive polymeric resistance heating layer including graphite or carbon fiber additives or a conductive cloth including graphite or carbon fibers or graphite or carbon coated fibers, as described above in connection with continuous element structure 10 and resistance heating layer 16.

Container 300 includes an interior surface 222 defined by the first polymeric layer 202 and an exterior surface 224 defined by the second polymeric layer 204. The polymeric layers 202, 204 may also include thermally conductive and insulative additives and/or vary in thickness to effectively bias heat generated by the resistance heating layer 206 towards the content of the container 300 as described above in connection with container 100.

FIG. 10 illustrates one exemplary external means of coupling the end portions 208 of container 300 to a power lead 400. The power lead 400 may be a copper bus bar or plate approximately the same width as the resistance heating layer 208. The copper bar 400 forms one half of a pair of power leads or electrical connectors, the other power lead or connector being coupled to the second one of the pair of terminal end portions 208 of the resistance heating layer 206. The copper bars 400 may be included within a cabinet structure (not shown) whereby the container 300 is fixed and aligned such that the edge portions 208 align with and are coupled to the copper bars as shown in FIG. 10. In this manner, the container 300 becomes a heat source for its contents when the edges of the resistance heating layer 206 are coupled to the power leads 400 and the resistance heating layer 206 is energized. FIG. 10 is an example of only one possible coupling means and merely illustrates that a good electrical connection is desirable between the power leads 400 and the end portions 208 of the resistance heating layer 206. For example, external power leads could be coupled to the exposed portions of the resistance heating layer in order to conduct current across the resistance heating layer as shown in FIG. 3, or as shown and described in connection with FIGS. 5 and 5A for resistance heating layer 60.

It should be apparent that the electrodes for coupling the container 300 to a power source are external to the container 300. If the resistance heating layer 206 comprises resistance heating material(s) which do not produce arcing when microwaved, the container, when not coupled to the electrodes or power leads 400, is microwaveable. This particular embodiment of a container 300, therefore, may be both energized and microwaved. This attribute is particularly beneficial with food packaging applications, particularly packaging for frozen foods. For example, a frozen lasagna dinner may be distributed as an individual product to a customer. The customer may re-thermalize the product by energizing the container with a power source, but assuming the customer does not posses an energizing "cabinet" or other appropriate coupling power source, the customer can microwave the lasagna dinner. The same packaged lasagna dinners may also be used by a restaurant or other food vendor, and rather than microwaving individual lasagna dinners, the vendor can place an individual container or a plurality of containers containing the frozen lasagna in an oven cabinet that includes a plurality of pairs of power leads 400 and an appropriate power source, i.e., a voltage source, in order to reheat the frozen or cold lasagna dinners. Leftovers may then be microwaved in the same container packaging that was originally energized to reheat the food product.

A container which is both microwaveable and energizeable includes a resistance heating layer that includes materials that are capable of producing resistance heat when energized and which are also microwaveable, i.e., materials that do not arc when microwaved for a desired cooking time and that do not convert too much microwave energy (if any) into thermal energy as to exceed the RTI rating of the polymeric layers.

One design consideration for producing a container 300 that is both microwaveable and energizeable, therefore, is material selection. The generalization that conductors, and particularly metals, cannot be microwaved is now know to be a fallacy. For example, it is now known that the shape of a metal tray can be designed to prevent arcing when the tray is placed in a microwave, and even aluminum foil containers are microwaveable when properly designed, as evidenced by the guidelines for safely microwaving aluminum containers promulgated by the Aluminum Foil Container Manufacturers Association (AFCMA). Some materials, specifically microwave receptor materials, and material configurations that are known to be safely microwaveable are described in U.S. Pat. Nos. 6,137,098, 5,811,769, 5,221,419, 5,211,810, 4,892,782, and 4,703,148, the entirety of which are hereby incorporated by reference. These materials include metals such as nickel, antimony, copper, molybdenum, bronze, iron, chromium, tin, zinc, silver, gold, aluminum, and ferrites, and alloys such as stainless steel (iron, chromium, nickel alloy), nickel/iron/molybdenum alloys (e.g., Permalloy), nickel/iron/copper alloys (e.g., Mu-metal), and iron/nickel alloys (e.g., Hypernick), in particulate, short fiber or flake form or supported on a polymeric substrate layer by vapor deposition, vacuum deposition or sputtering, semiconductors, selected ferromagnetic materials, period 8 oxides and selected dielectric materials, flakes or particles of susceptor material embedded or deposited on a polyester strip, fibrous and non-fibrous materials coated with conductive polymers such as polyaniline, polypyrrole, and tetrathiafulvalene:tetracyanoquinodimethane, ionic conductors such as sodium chloride or perfluorocarbon ion exchange polymers, or combinations of susceptor materials, e.g., a mixture of metals or alloys, to name a few.

Examples of some resistance heating materials include powdered conducting or semi-conducting metals, or polymers, graphite, carbon, Ni—Cr alloy, certain copper, steel, and stainless-steel alloys, and positive temperature coefficient materials formed into conductive coatings, sheets, inks, wires, ribbons, foils or printed circuits, and woven or non-woven fibrous structures, with or without a supporting substrate, and including conductive fibers or fibers coated with a conductive materials such as graphite or carbon, to name a few.

Once a material is selected that may be energized to produce resistance heating and which may be made microwaveable without arcing (whether with or without microwave susceptor qualities), the material may be configured in a resistance heating layer of a container in a manner that avoids arcing, thereby producing a container that may be safely microwaved and which is also energizeable. Some design consideration may include: (a) the RTI rating of the polymer layers encapsulating the resistance heating layer; (b) the size and depth of the container; (c) the thickness of the resistance heating layer; (d) the amount of product contained in the container; (e) the wattage rating of the microwave; (f) the resistivity or volume resistivity (if applicable) of the resistance heating layer; (g) the shape of the resistance heating layer; and (h) the use of microwave shielding for the resistance heating material.

As described above, the continuous element structures 10, 200 lend themselves to many automated and secondary manufacturing techniques, such as stamping, die cutting, and overmolding, to name a few. Designers can easily choose thermoplastics and other materials for their designs that meet required RTI requirements for specific applications by following standard design techniques and parameters set by materials manufacturers. Also, heated containers such as described above allow the food industry as well as individuals to efficiently and effectively reheat prepared foods, as is often required of businesses that operate large or small food service venues or that purchase from distributors of prepared foods. Also, among the many advantages of the present invention is the ability to intimately locate a secondary device captured between the polymeric layers, such as a thermistor or thermocouple.

Although various embodiments have been illustrated, this is for the purpose of describing, but not limiting the invention. For example, a heated container could be formed from two or more continuous element structures. Likewise, although only open containers have been illustrated, closed containers are within the scope of the present invention. Also, fitted heated lids formed from the laminated continuous element structures described above may be used in connection with the open container and may be coupled to the same power source as the container. The heated containers of the present invention, also, are by no means limited to containers for food products, but may have utility in many industries, such as the medical industry. Therefore, various modifications which will become apparent to one skilled in the art are within the scope of this invention described in the attached claims.

What is claimed is:

1. A container comprising:
   (a) an electrically insulative and thermally conductive first polymeric layer;
   (b) an electrically insulative and thermally insulative second polymeric layer; and
   (c) a resistance heating layer laminated between said first and second polymeric layers to form a substantially continuous element structure, said resistance heating layer coupled to a pair of electrical connectors,
   wherein said substantially continuous element structure is formed into a final container structure having an interior surface and an exterior surface, said interior surface comprising said first polymeric layer and said exterior surface comprising said second polymeric layer.

2. The container of claim 1, wherein said resistance heating layer includes a conductive polymeric resistance heating layer.

3. The container of claim 1, wherein said resistance heating layer includes a woven or non-woven conductive cloth comprising conductive fibers.

4. The container of claim 3, wherein said conductive fibers includes graphite fibers, carbon fibers, fibers coated with graphite or carbon, or a combination thereof.

5. The container of claim 1, wherein said substantially continuous element structure is thermoformed into said final container structure.

6. The container of claim 1, wherein said substantially continuous element structure is vacuum formed or compression formed into said final container structure.

7. The container of claim 1, wherein said first polymeric layer includes thermally conductive additives.

8. The container of claim 1, wherein said second polymeric layer includes thermally insulative additives.

9. The container of claim 1, wherein said second polymeric layer is thicker than said first polymeric layer.

10. The container of claim 1, wherein said substantially continuous element structure is shaped in a foldable profile that is configured to be formed into said final container structure.

11. The container of claim 1, wherein said resistance heating layer includes a conductive polymeric resistance heating layer and a woven or non-woven conductive cloth comprising conductive fibers, wherein said conductive polymeric resistance heating layer and said conductive cloth are laminated together to form a substantially continuous resistance heating layer.

12. The container of claim 1, further comprising a frozen food product disposed within said container, said frozen food product substantially conforming to said interior surface of said container such that air gaps formed between said interior surface and said food product are substantially reduced.

13. The container of claim 1, wherein said continuous element structure is over molded with a polymer such that said over molded polymer and continuous element structure form a substantially homogenous structure.

14. The container of claim 1, wherein a first one of said electrical connectors is coupled to a top surface of said resistance heating layer and a second one of said electrical connectors is coupled to a bottom surface of said resistance heating layer.

15. The container of claim 1, wherein a first one of said electrical connectors is coupled along a first lateral edge of said resistance heating layer and a second one of said electrical connectors is coupled along a second lateral edge of said resistance heating layer.

16. A container comprising:
   (a) an electrically insulative and thermally conductive first polymeric layer;
   (b) an electrically insulative and thermally insulative second polymeric layer; and
   (c) a resistance heating layer laminated between said first and second polymeric layers to form a substantially continuous element structure, said resistance heating layer having a pair of exposed terminal end portions which may be coupled to a pair of external power leads to energize said resistance heating layer,
   wherein said substantially continuous element structure is formed into a final container structure having an interior surface and an exterior surface, said interior surface comprising said first polymeric layer and said exterior surface comprising said second polymeric layer.

17. The container of claim 16, wherein said resistance heating layer includes a conductive polymeric resistance heating layer.

18. The container of claim 16, wherein said resistance heating layer includes a woven or non-woven conductive cloth comprising conductive fibers.

19. The container of claim 17, wherein said conductive fibers includes graphite fibers, carbon fibers, fibers coated with graphite or carbon, or a combination thereof.

20. The container of claim 16, wherein said substantially continuous element structure is thermoformed into said final container structure.

21. The container of claim 16, wherein said substantially continuous element structure is vacuum formed or compression formed into said final container structure.

22. The container of claim 16, wherein said first polymeric layer includes thermally conductive additives.

23. The container of claim 16, wherein said second polymeric layer is thicker than said first polymeric layer.

24. The container of claim 16, wherein said substantially continuous element structure is shaped in a foldable profile that is configured to be formed into said final container structure.

25. The container of claim 16, wherein said resistance heating layer includes a conductive polymeric resistance heating layer and a woven or non-woven conductive cloth comprising conductive fibers, wherein said conductive polymeric resistance heating layer and said conductive cloth are laminated together to form a substantially continuous resistance heating layer.

26. The container of claim 16, further comprising a frozen food product disposed within said container, said frozen food product substantially conforming to said interior surface of said container such that air gaps formed between said interior surface and said food product are substantially reduced.

27. The container of claim 16, wherein said exposed terminal end portions are configured to be coupled to a pair of power leads, a first one of said power leads coupled to a top surface of said resistance heating layer and a second one of said power leads coupled to a bottom surface of said resistance heating layer.

28. The container of claim 16, wherein said exposed terminal end portions are configured to be coupled to a pair of power leads, a first one of said power leads coupled along a first lateral edge of said resistance heating layer and a second one of said power leads coupled along a second lateral edge of said resistance heating layer.

29. A packaged food product, comprising:
   a container comprising:
      (a) an electrically insulative and thermally conductive first polymeric layer;
      (b) an electrically insulative and thermally insulative second polymeric layer; and
      (c) a resistance heating layer laminated between said first and second polymeric layers to form a substantially continuous element structure, said resistance heating layer coupled to a pair of electrical connectors, wherein said substantially continuous element structure is formed into a final container structure having an interior surface and an exterior surface, said interior surface comprising said first polymeric layer and said exterior surface comprising said second polymeric layer; and
   a frozen food product disposed within said container, said frozen food product substantially conforming to said interior surface of said container such that air gaps formed between said interior surface and said food product are substantially reduced.

30. The packaged food product of claim 29, wherein said resistance heating layer includes a conductive polymeric resistance heating layer.

31. The packaged food product of claim 29, wherein said resistance heating layer includes a woven or non-woven conductive cloth comprising conductive fibers.

32. The packaged food product of claim 31, wherein said conductive fibers includes graphite fibers, carbon fibers, fibers coated with graphite or carbon, or a combination thereof.

33. The packaged food product of claim 29, wherein said second polymeric layer is thicker than said first polymeric layer.

34. The packaged food product of claim 29, wherein said first polymeric layer includes thermally conductive additives.

35. The packaged food product of claim 29, wherein said second polymeric layer includes thermally insulative additives.

36. A method of preparing a packaged food product, comprising the steps of:
   providing a container, comprising:
      (a) an electrically insulative and thermally conductive first polymeric layer;

(b) an electrically insulative and thermally insulative second polymeric layer; and
(c) a resistance heating layer laminated between said first and second polymeric layers to form a substantially continuous element structure, said resistance heating layer coupled to a pair of electrical connectors or having a pair of exposed terminal end portions which may be coupled to a pair of external power leads to energize said resistance heating layer, wherein said substantially continuous element structure is formed into a final container structure having an interior surface and an exterior surface, said interior surface comprising said first polymeric layer and said exterior surface comprising said second polymeric layer;

disposing a non-frozen food product in said container, said non-frozen food product contacting said interior surface; and freezing said non-frozen food product in said container to form a frozen food product, said frozen food product substantially conforming to said interior surface of said container such that air gaps formed between said interior surface and said food product are substantially reduced.

* * * * *